(No Model.) 4 Sheets—Sheet 2.
E. F. STODDARD & A. F. BROWN.
MOWING MACHINE.
No. 388,741. Patented Aug. 28, 1888.
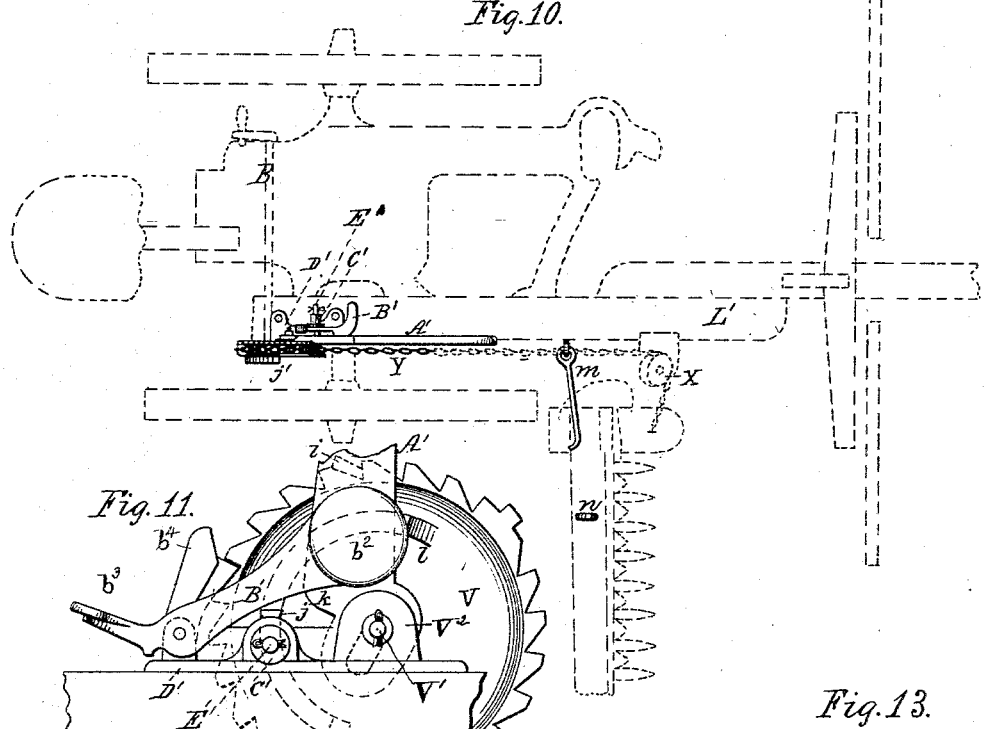
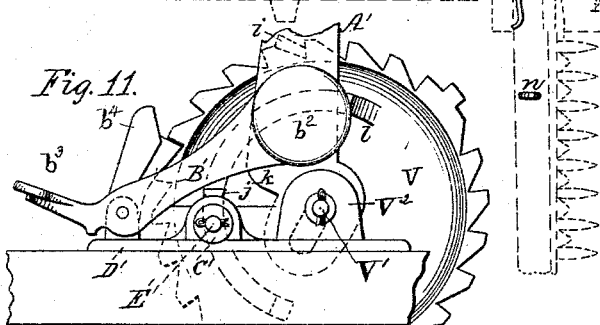
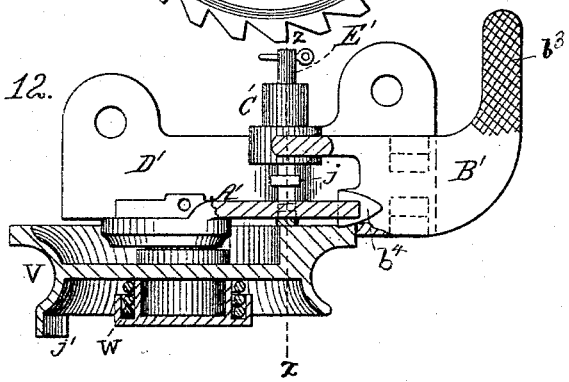
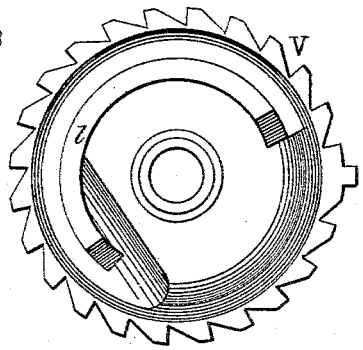
Witnesses:
W. C. Jirdinston
Charles Dillon
Inventors:
E. Forley Stoddard
Arthur F. Brown
by Peck & Rector,
their Attorneys.

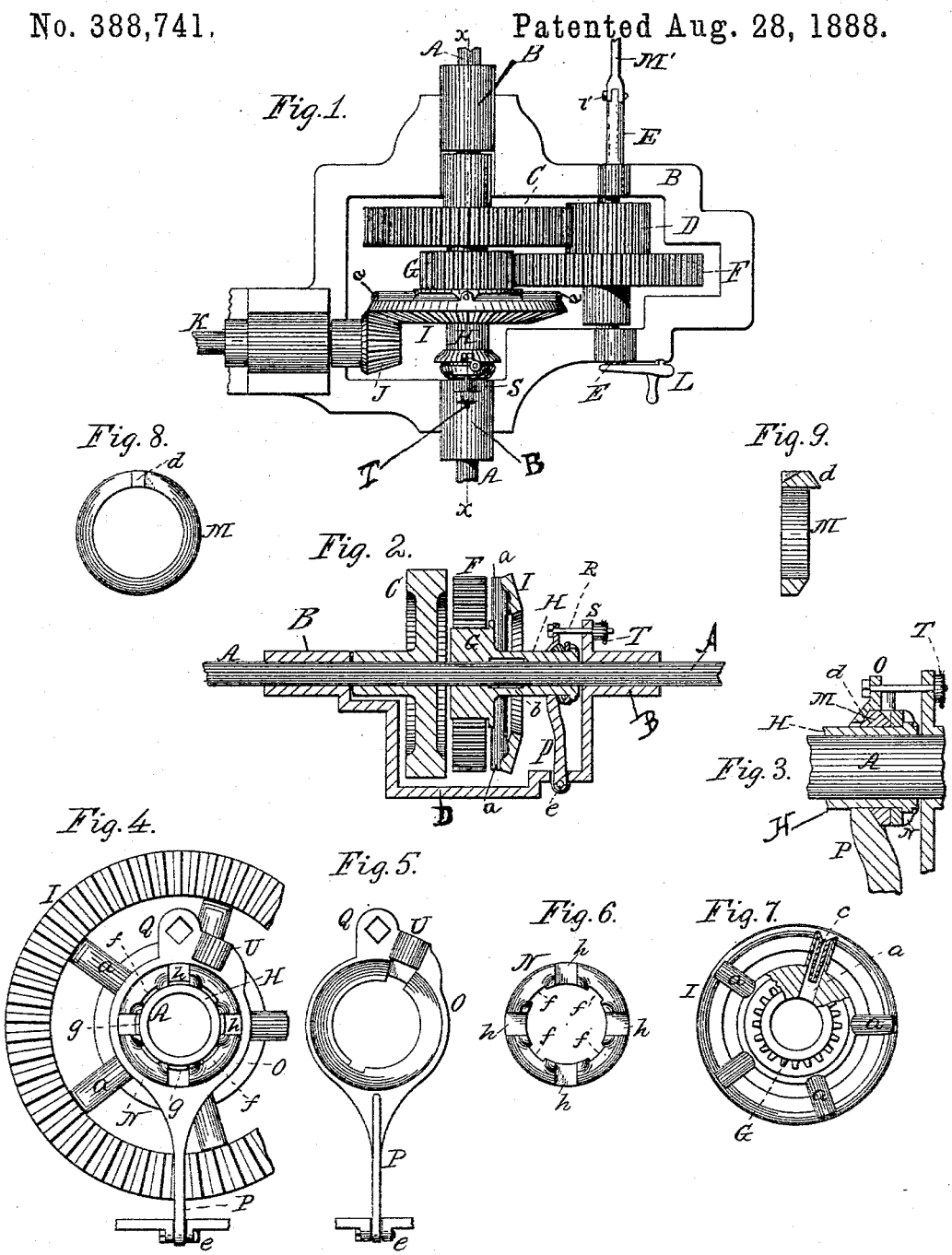

(No Model.) 4 Sheets—Sheet 3.
E. F. STODDARD & A. F. BROWN.
MOWING MACHINE.
No. 388,741. Patented Aug. 28, 1888.
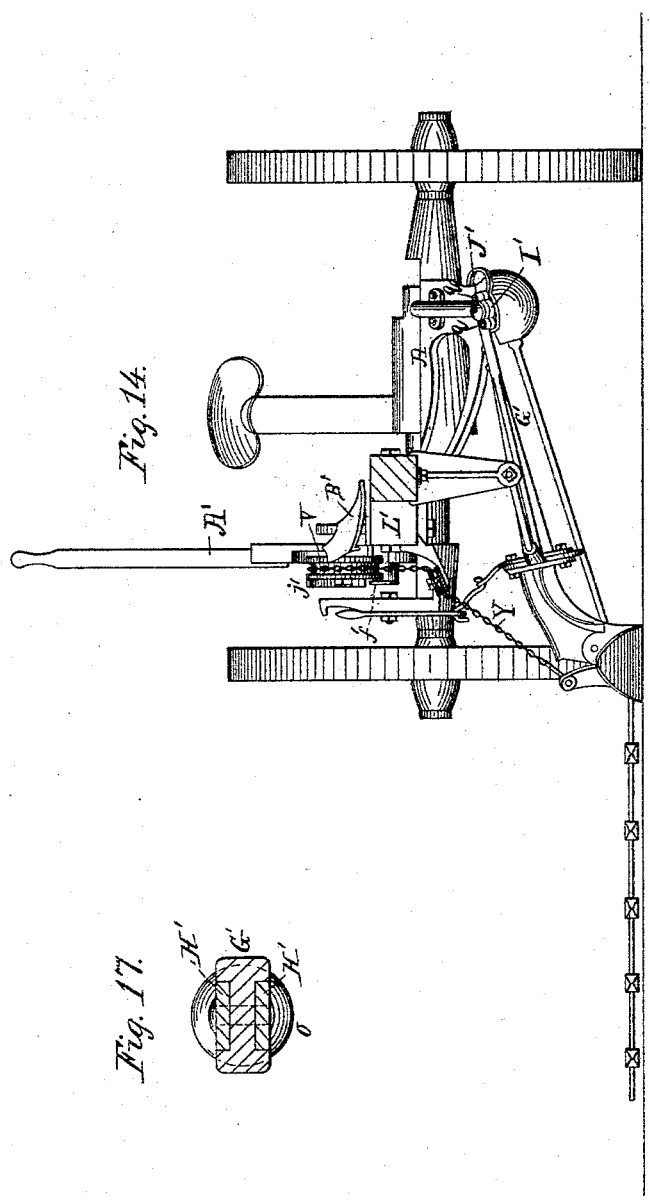
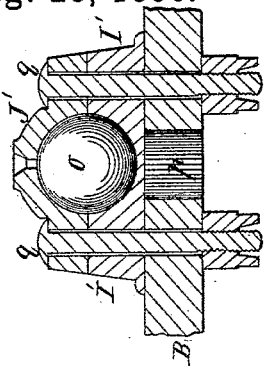
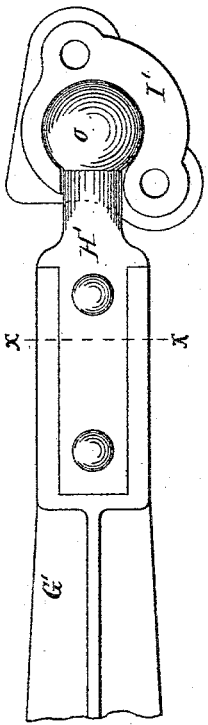
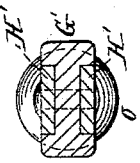
Witnesses:
W. C. Jirdinston
Charles Billon
Inventors:
E. Fowler Stoddard
and Arthur F. Brown,
by Peek & Rector,
their Attorneys.

(No Model.) 4 Sheets—Sheet 4.
E. F. STODDARD & A. F. BROWN.
MOWING MACHINE.
No. 388,741. Patented Aug. 28, 1888.
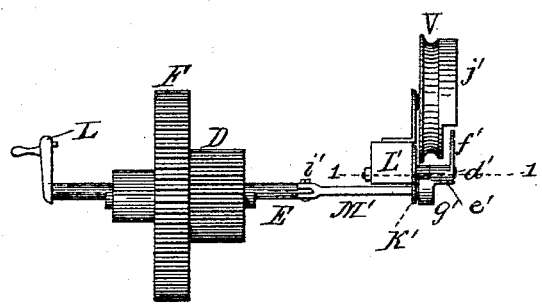
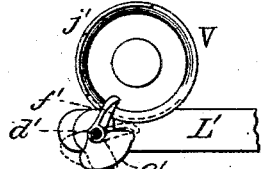
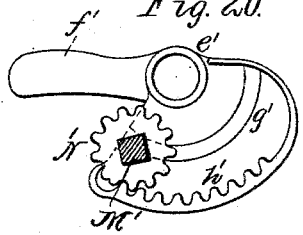
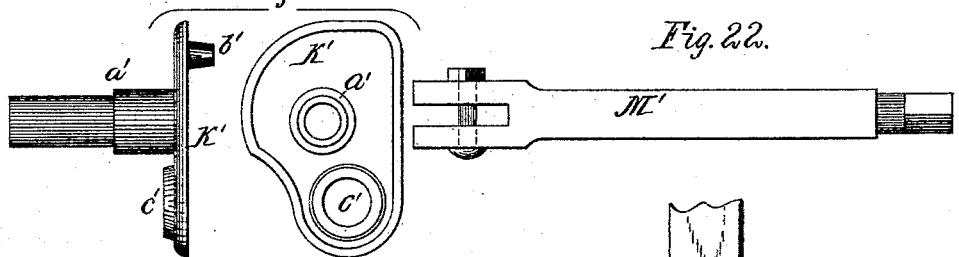
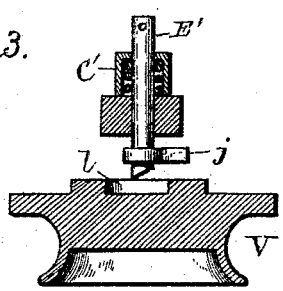
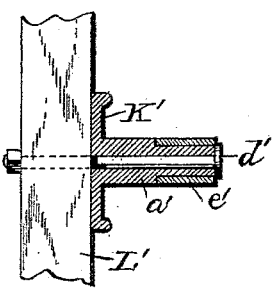
Witnesses:
W. C. Jirdinston.
Charles Billon.
Inventors:
E. Fowler Stoddard
and Arthur F. Brown
by Peek & Rector
their Attorneys.

UNITED STATES PATENT OFFICE.

E. FOWLER STODDARD AND ARTHUR F. BROWN, OF DAYTON, OHIO, ASSIGNORS TO THE STODDARD MANUFACTURING COMPANY, OF SAME PLACE.

MOWING-MACHINE.

SPECIFICATION forming part of Letters Patent No. 388,741, dated August 28, 1888.

Application filed May 18, 1887. Serial No. 238,697. (No model.)

*To all whom it may concern:*

Be it known that we, E. FOWLER STODDARD and ARTHUR F. BROWN, citizens of the United States, residing at Dayton, in the county of Montgomery and State of Ohio, have jointly invented certain new and useful Improvements in Mowing-Machines, of which the following is a full, clear, and exact description, reference being had to the accompanying drawings, forming part of this specification.

Our invention relates to that class of mowing-machines known as "two-wheel front-cut" machines, and has for its object an improvement in the construction of the machine described in Patent No. 336,267, of February 16, 1886.

The novelty of the invention will be herein set forth, and specifically pointed out in the claims.

In the accompanying drawings, Figure 1 is a detail plan view of the driving-gearing. Fig. 2 is a sectional elevation of the same through the dotted line $xx$ of Fig. 1. Figs. 3, 4, 5, 6, 7, 8, and 9 are details of the various parts composing the driving-gearing mechanism, to be referred to more particularly in the body of the specification. Fig. 10 is an outline plan view of a mower, showing the location of the lifting ratchet-sheave and its operating-lever. Fig. 11 is an enlarged inside elevation of the lifting ratchet-sheave and its connections. Fig. 12 is a plan view of the same with the ratchet-sheave and other parts in section. Fig. 13 is an inside face view of the ratchet-sheave detached. Fig. 14 is a front elevation of the mower. Fig. 15 is an enlarged detail showing the ball-and-socket connection of the upper end of the coupling-arm. Fig. 16 is an enlarged sectional detail of the detachable two-part box forming the socket for the coupling-arm. Fig. 17 is an enlarged section through the dotted line $xx$ of Fig. 15. Fig. 18 is a rear elevation of the shipping-gears, the lifting-sheave, and connecting mechanism. Fig. 19 is a side elevation of the lifting-sheave and tripping wiper-rack. Fig. 20 is an enlarged inside view of the tripping wiper-rack and its pinion. Fig. 21 is an enlarged side elevation and plan of the bearing for the wiper-rack and coupling-shaft. Fig. 22 is an enlarged plan of the coupling-shaft. Fig. 23 is a vertical section on the line $zz$ of Fig. 12. Fig. 24 is a section on the line 1 1 of Fig. 18.

The same letters of reference are used to indicate identical parts in all the figures.

The first feature of our invention, reference being had to Figs. 1 to 9, inclusive, relates to the driving mechanism, which is substantially that shown in the patent before referred to, with the exceptions to be hereinafter pointed out.

A represents the axle of the machine, driven in the usual way by ratchet-connections with the carriage-wheels; and B, the box constituting part of the main frame, in which the axle is journaled and the driving mechanism contained.

C is the large pinion, whose hub is keyed or otherwise fastened to the axle, and which meshes with a smaller pinion, D, upon an eccentric counter-shaft, E. The pinion D has secured to or formed with it a larger pinion, F, which meshes with a smaller pinion, G, journaled and free to turn upon the axle A by the side of the pinion C. This pinion G has secured to or formed with it a hub, H, extending toward the stubble and carrying a beveled gear-wheel, I, which, if desired, may be integral with the hub, and which meshes with the smaller beveled pinion, J, upon the end of the pitman-driving shaft K.

By oscillating the shaft E by means to be presently described the pinions C D and F G are thrown out of mesh to stop the vibration of the cutter-bar for any purpose, as in transporting the machine from place to place.

As the greater strain and wear exist between the beveled pinions I and J, it is necessary that they should be held at all times in close working contact, and that the hub H should be freely lubricated. To accomplish this latter object, we provide radial openings $a$ from the periphery of the inner face of the beveled pinion I, which extend into and communicate with an enlargement, $b$, in the bore of the hub, which enlargement serves as a chamber to retain the lubricant. A number of these openings $a$ is provided, so that the hub can be easily lubricated by always having one uppermost at almost any position in which the machine may happen to stop.

To prevent the escape of the lubricant, the outer ends of the openings $a$ are fitted with feeding-nozzles $c$, which extend for some distance within the openings and form traps. As the most convenient way of constructing and applying these feeding-nozzles, we make them of lead and tapering from the upper end down. By inserting them in the openings $a$ and using a countersink or die which spreads the upper end, as shown, they may be securely fastened in place by one or two taps of the hammer. To accomplish the former object— namely, to overcome the end-thrust of the pinion J upon the pinion I, and at the same time to hold these pinions in close working contact and to take up the wear—we provide two, preferably chilled, washers, M and N, the former of which is fitted upon the hub H and locked from revolving by means of one or more lugs, $d$, in a dished collar, O, surrounding the hub H and supported upon an arm, P, whose lower end is pivoted, as at $e$, in the bottom of the box. The outer face of the washer M is flat and bears against the flattened inner face of the washer N, which is locked to the outer end of the hub H, so as to revolve with the hub. As the simplest means of locking the washer N to the hub H, we construct it as shown in Fig. 6, where $f$ are notches in the bore of the washer, which permit it to be slipped over the lugs $g$ upon the periphery of the hub at its outer end.

The outer side of the washer is provided with recesses $h$, which, after the washer has been slipped past the lugs $g$ and partially turned, receive said lugs, thereby forming a lock, as seen in Fig. 4 and as will be readily understood. This construction enables the replacement of worn or broken washers with new ones to be made with very little trouble or expense.

The upper end of the collar O is provided with a lug or projection, Q, having a square or polygonal aperture through it to permit the passage and prevent the turning of a bolt, R, which passes outward through a perforated lug, S, upon the box B and receives upon its end a nut, T, by tightening which the collar O is drawn outward and the two flat faces of the washers M and N brought into bearing contact.

U is an oiling-aperture in the upper part of the collar O for admitting oil to the bearing-faces of the washers.

It will be seen from this construction that the pinions I and G cannot be crowded back against the pinion C, but are drawn outward and held securely by the adjustable collar O and washers M N, and in the event of wear the tightening of the nut T will effectually take up such wear and cause the pinions I J to be always in proper working contact.

The next feature of our invention (illustrated in Figs. 10, 11, 12, and 13) relates to the mechanism for raising up and supporting the finger-bar and cutting apparatus, and is an improvement upon that described in the patent before referred to in the particulars to be presently pointed out. We employ substantially the same ratchet-sheave V, with its spiral spring W, guide-pulley X, and lifting-chain $v$. The operating hand-lever A' is loosely fitted upon the inner side of the hub of the ratchet-sheave, and is provided on its outer side with an engaging tooth, $i$, as shown in Fig. 11, by which it can be locked to the teeth of the ratchet. V' is its supporting-pin, and V² its bracket.

B' is the weighted pedal-dog, of substantially the same construction as that in the patent before referred to.

Secured in a housing, C', upon the plate D' is a spring-projected bolt, E', provided with an anvil or stop, $j$, which, when said bolt is projected by its spring, comes under a shoulder, $k$, upon the lever A' in such manner as to arrest the same and prevent the lever from accidentally tripping the dog B'. When the finger-bar is down at work, the bolt E' is pushed back by means of a segment cam or rib, $l$, upon the inner side of the ratchet-sheave. This rib is so located that the first backward stroke of the lever A' in partially lifting the cutting apparatus—say some six or eight inches in a horizontal position—does not quite bring the rib out of engagement with the bolt; but the further operation of the lever in lifting the cutting apparatus carries the rib from under the beveled nose of the bolt, whereupon the bolt is projected so as to bring the stop $j$ under the shoulder $k$ of the lever, thus positively preventing the next forward throw of the lever in making a fresh engagement with the ratchet from coming in contact with and accidentally tripping the dog B'. To hold the cutting apparatus supported positively, we employ a hook, $m$, which, conveniently pivoted to the frame-work, engages with an eye, $n$, upon the finger-bar.

The next feature of our invention relates to the coupling-arm and its ball-and-socket connection with the frame of the machine, and is illustrated in Figs. 14, 15, 16, and 17.

The coupling-arm G', instead of having the ball $o$ formed integral with it, as heretofore, has the same formed upon a detachable piece, H', which is riveted or bolted to the upper end of the coupling-arm, as shown in Figs. 15 and 17, where channels are formed in the arm G' to receive and where the piece H' is slotted to form tangs, which fit into said channels, thus forming a secure joint. We do not, however, limit ourselves to this particular connection between the parts.

The ball $o$, instead of being fitted into a recess in the frame B, is secured in a two-part box, I' J', the former of which parts rests flat upon the frame B and is provided with a dowel, $p$, that fits into an aperture in the frame, as seen in Fig. 16, while the latter part, J', constitutes a cap resting upon the part I' and inclosing the ball. Bolts $q$, passed through the box I' J' and the frame, serve to firmly unite the parts. By this construction great strength and economy are obtained, for heretofore, should the ball wear, as frequently happened, the whole coupling-arm had to be replaced; but now it is only necessary to take off the piece H' and replace it with a new one, at a trifling cost. Again, should the socket wear, there was no remedy except to take off and replace it with a new one—the entire frame—while with the above construction the box I' J' can be readily removed and replaced with new ones.

The remaining feature of our invention (illustrated more particularly in Figs. 1, 14, 18, 19, 20, 21, and 22) consists in means for automatically throwing the driving-pinions D F out of gear by the act of raising the cutting apparatus, thereby preventing any possible injury to the machine should the driver neglect to reverse the crank L before starting and after the cutting apparatus had been raised.

We provide a bearing, K', with a hollow spindle, $a'$, a dowel, $b'$, and a bossed opening, $c'$, as seen in Fig. 21, which bearing is fitted to the side of the pole L' and is secured by a bolt, $d'$, passed through the hollow spindle and the pole, as seen in Fig. 18.

Fitted upon the spindle $a'$ is a sleeve, $e'$, from which extends upward, at its outer end, a wiper-arm, $f'$, and downward from its inner end a shell, $g'$, the inner side of the flange of which is a segmental rack, $h'$, and which whole piece we designate a "wiper-rack."

Extending under the pole is a coupling-shaft, M', one end of which passes through and is journaled in the opening $c'$ of the bearing K' and carries upon its end a pinion, N', which is inclosed by the shell $g'$ and engages with the rack $h'$. The outer end of the shaft is suitably coupled, as at $i'$, to an extension of the eccentric-shaft E.

Upon the outer side of the sheave V is a segment-flange, $j'$, so located that as soon as the operation of the lever A' lifts the cutting apparatus above a horizontal position the flange $j'$ comes in contact with the wiper-arm $f'$, presses it down, and thereby vibrates the shell $g'$, which in turning rotates the pinion N' and shaft M'. This operation rotates the eccentric-shaft E and throws the pinions D F out of gear, as will be readily understood. The crank-handle L will then lie in front of the eccentric shaft. When the cutting apparatus is lowered, the wiper-rack is released and the pinions D F can be thrown into gear again by the driver reversing the crank-handle L, which operation will reset the wiper-rack.

Having thus fully described our invention, we claim—

1. In the driving-gear of a mower, the beveled pinion I, provided with a series of hollow bosses extending from the periphery of said pinion to its hub, with their bores communicating with the shaft upon which said pinion is journaled, said bores being provided at their outer ends with feeding-nozzles extending therein to form traps, substantially as described.

2. In the driving-gear of a mower, the combination, with the beveled pinion on the pitman-driving shaft, of the beveled gear-wheel meshing therewith, revolving loosely upon the axle of the machine, and provided with a hub carrying at its end opposite the pinion a bearing-washer locked thereto, which bears against a second and non-revolving bearing-washer interposed between said locked washer and beveled gear and adjustably connected to a fixed point of the frame, whereby the end-thrust is entirely borne by said washers and kept from being thrown upon other parts of the driving-gearing, substantially as described.

3. The lever P, journaled to the frame of the machine and carrying at its upper end a collar, O, encircling the hub H and provided with an adjusting-bolt, R, and the chilled washer M, locked to the collar O, in combination with the washer N, locked upon the end of the projecting hub H, which carries the driving-pinions I G, the parts constructed and arranged substantially as and for the purpose specified.

4. The ratchet-sheave V, provided on its inner side with the segmental rib $l$, in combination with the spring-projected bolt E', having a stop-shoulder, $j$, the pedal-locking dog B', and lifting-lever A', the parts constructed and arranged substantially as and for the purpose specified.

5. The spring ratchet-sheave V, provided on its inner side with the segmental rib $l$, in combination with the spring-projected bolt E', having a stop-shoulder, $j$, the pedal-locking dog B', and lifting-lever A', the parts constructed and arranged substantially as and for the purpose specified.

6. The coupling-arm G', having its upper end channeled, in combination with the extension H', provided with the ball $o$, and tangs to fit the channels of the coupling-arm, substantially as described.

7. The combination, with the main frame of a mower and its coupling-arm provided with a ball, of the box consisting of the two parts I J, separated from the frame and recessed to form a socket for the ball, the lower part of which box rests upon the main frame and is provided with a dowel to fit into a corresponding hole in the main frame, and bolts for uniting the parts, substantially as described.

8. The combination, with the lifting-sheave provided with a segment-flange, of a wiper-rack pivoted to the main frame and separate from said sheave, a pinion engaging with said rack, and a coupling-shaft interposed between said pinion and the eccentric driving-gear shaft, substantially as described.

9. The combination and arrangement of the sheave V, with its flange $j'$, the wiper-arm $f'$, wiper-rack $h'$, shell $g'$, the bearing K', with its hollow spindle $a'$, the pole L', the coupling-shaft M', with its pinion N', engaging with the rack, and the eccentric-shaft E, and driving-gearing on the eccentric and main shafts, substantially as and for the purpose specified.

E. FOWLER STODDARD.
ARTHUR F. BROWN.

Witnesses:
CHAS. W. FINCH,
T. S. JONES.